US008572387B2

(12) United States Patent
Narayanan et al.

(10) Patent No.: US 8,572,387 B2
(45) Date of Patent: Oct. 29, 2013

(54) AUTHENTICATION OF A PEER IN A PEER-TO-PEER NETWORK

(75) Inventors: Sathya Narayanan, Plainsboro, NJ (US); Eunsoo Shim, West Windsor, NJ (US); Greg Daley, Plainsboro, NJ (US); David A. Braun, Danville, NJ (US)

(73) Assignee: Panasonic Corporation, Osaka (JP)

( * ) Notice: Subject to any disclaimer, the term of this patent is extended or adjusted under 35 U.S.C. 154(b) by 1962 days.

(21) Appl. No.: 11/493,453

(22) Filed: Jul. 26, 2006

(65) Prior Publication Data
US 2008/0046740 A1 Feb. 21, 2008

(51) Int. Cl.
*H04L 29/06* (2006.01)
(52) U.S. Cl.
USPC .......................... 713/176; 713/155; 713/169
(58) Field of Classification Search
USPC ........... 713/151, 176, 182, 155, 169; 709/205
See application file for complete search history.

(56) References Cited

U.S. PATENT DOCUMENTS

| 5,491,752 A | 2/1996 | Kaufman et al. |
| 5,519,778 A | 5/1996 | Leighton et al. |
| 6,233,565 B1 * | 5/2001 | Lewis et al. ...................... 705/35 |
| 6,539,479 B1 * | 3/2003 | Wu ................................ 713/151 |
| 7,024,690 B1 * | 4/2006 | Young et al. ....................... 726/5 |
| 2002/0181701 A1 * | 12/2002 | Lee .................................. 380/1 |
| 2003/0177186 A1 * | 9/2003 | Goodman et al. ............ 709/205 |
| 2005/0223086 A1 | 10/2005 | Raverdy et al. |
| 2007/0016630 A1 * | 1/2007 | Samji et al. ................... 707/204 |

OTHER PUBLICATIONS

T. Leighton, S. Micali, Secret-Key Agreement Without Public-Key Cryptography (extended abstract), pp. 456-479, published 1993.

* cited by examiner

*Primary Examiner* — Jeffrey Pwu
*Assistant Examiner* — Thong Truong
(74) *Attorney, Agent, or Firm* — RatnerPrestia

(57) ABSTRACT

A method of authentication of a verifying device by a confirming device includes the confirming device receiving and storing a shared secret derived from at least a password of a user and sending a challenge. The method further includes the confirming device receiving a response to the challenge using the shared secret; determining if the response to the challenge is correct and if the response to the challenge is correct, authenticating the verifying device.

28 Claims, 7 Drawing Sheets

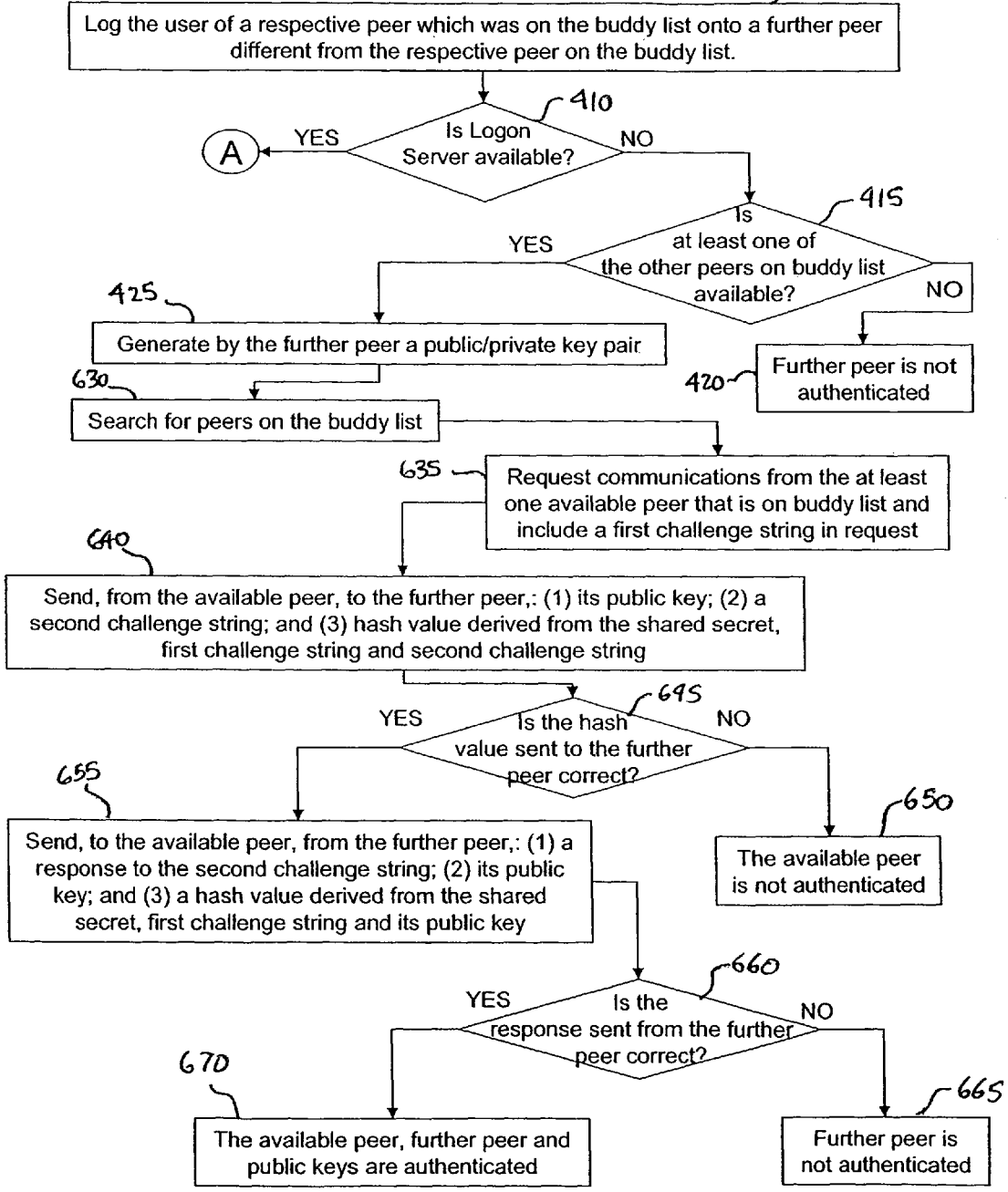

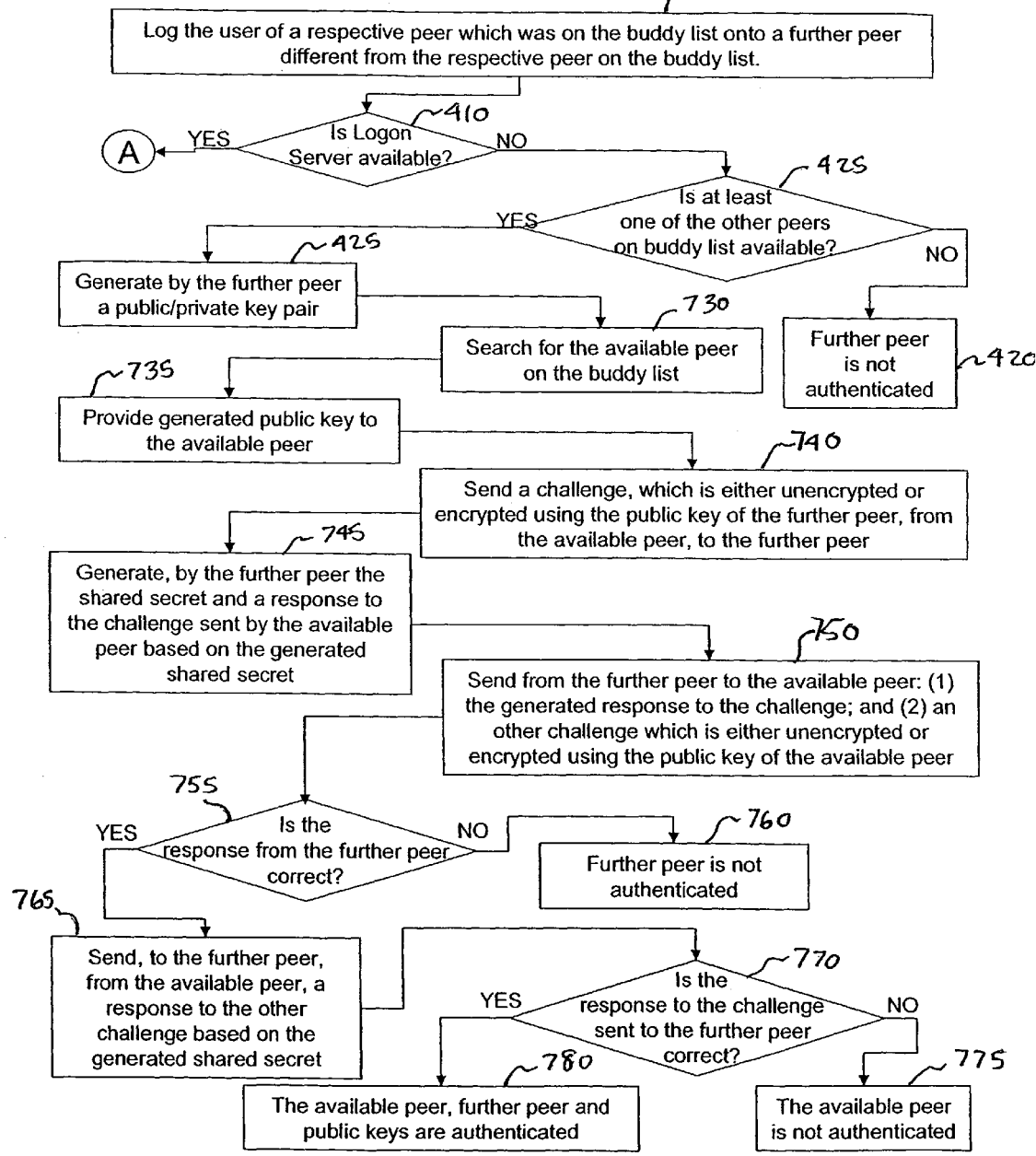

AUTHENTICATION OF A PEER IN A PEER-TO-PEER NETWORK

FIELD OF THE INVENTION

The present invention relates to the field of authentication, generally and, in particular, a method of authentication one device by another device in a network.

BACKGROUND OF THE INVENTION

In a typical, conventional authentication system, a private key encrypts a message (the encrypted message is known as a digital signature) such that anyone having a public key (a published key) may decrypt the message. Digital signatures can be used to sign electronic documents and to ensure their integrity. That is, certificates may be provided, for example, by a login server (a trusted authority). These certificates which are digital signed by the login server provide security credentials for each user on the network. The security credentials are based on the requesting device and its user. The login server, generally knows the password of the user and issues the certificate to the device the user is logged into based on verification of the password of the user.

SUMMARY OF THE INVENTION

The present invention is embodied in a method of authentication of a verifying device by a confirming device. The method includes the confirming device receiving and storing a shared secret derived from at least a password of a user of the verifying device and sending a challenge to the verifying device. The method further includes the confirming device receiving a response to the challenge using the shared secret from the verifying device; determining if the response to the challenge is correct and if the response to the challenge is correct, authenticating the verifying device.

The present invention may also be embodied in a method of authentication of a verifying device by a confirming device. The method includes the confirming device receiving and storing a shared secret derived from at least a password of a user and receiving a challenge including a first challenge bit string. The method further includes the confirming device sending a response to the challenge including: (1) a second challenge bit string and (2) a value derived from combination of the shared secret, the first challenge bit string and the second challenge bit string. The method also includes the verifying device determining if the response to the challenge is correct. If the response to the challenge is correct, the verifying device authenticates the confirming device.

The present invention may also be embodied in a method of authentication of a verifying device by a confirming device using a secret. The method includes the confirming device receiving and storing the secret derived from at least a password of a user and sending to the verifying device a challenge. The method further includes the verifying device generating the secret using the password provided by the user and sending a response to the challenge using the generated secret. The method also includes the confirming device determining if the response to the challenge is correct. If the response to the challenge is correct, the confirming device authenticates the verifying device.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. Moreover in the drawings, common numerical references are used to represent like features/elements. Included in the drawing are the following figures:

FIG. 6 is a flow chart illustrating a method of authentication in accordance with another exemplary embodiment of the present invention; and FIG. 7 is a flow chart illustrating a method of authentication in accordance with yet another exemplary embodiment of the present invention.

DETAILED DESCRIPTION OF THE INVENTION

Figure 1:
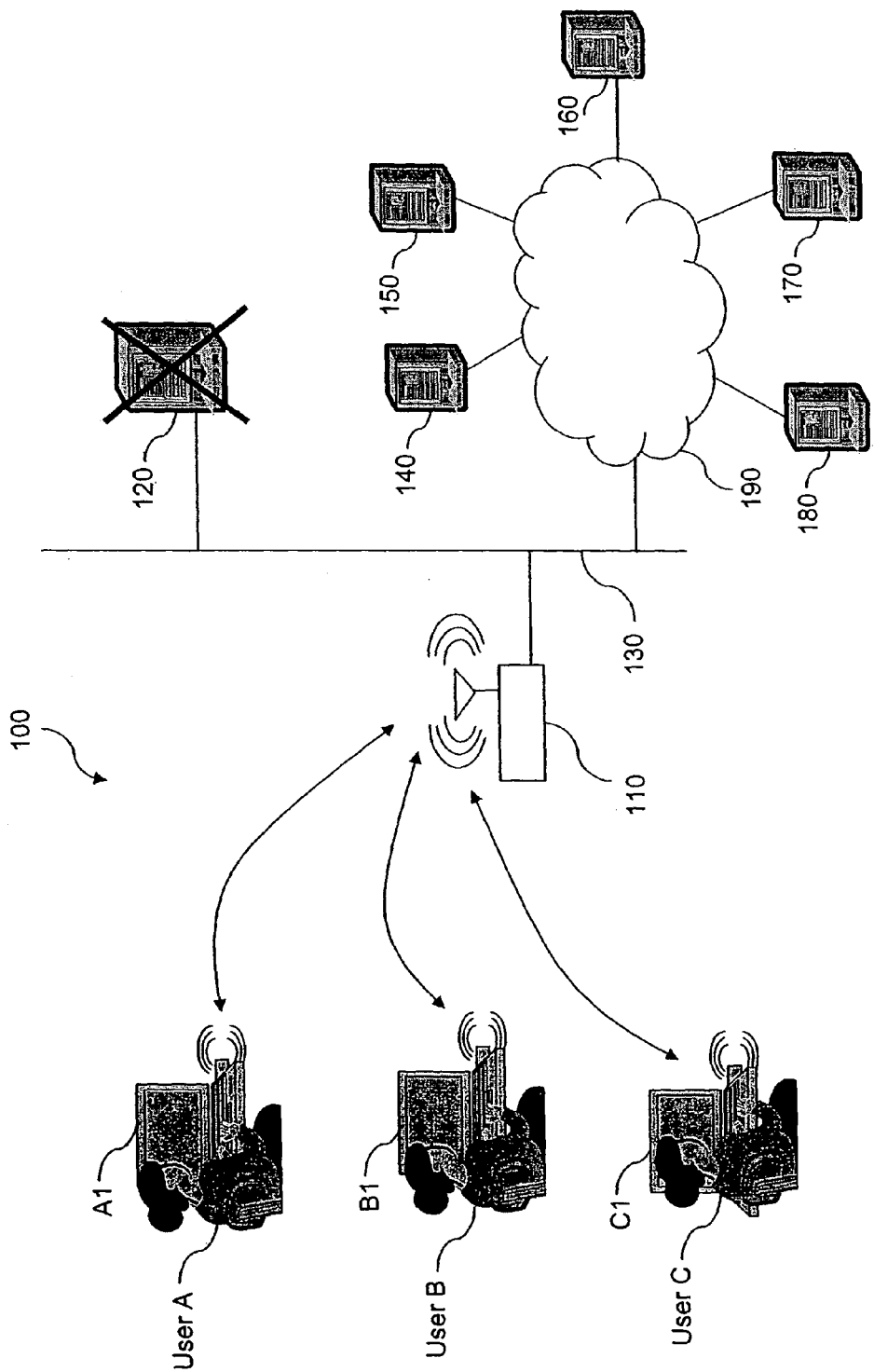
FIG. 1 is a schematic diagram of a network to illustrate a method of authentication of a verifying device according to certain exemplary embodiments of the present invention.

Although the invention is illustrated and described herein with reference to specific embodiments, it is not intended to be limited to the details shown. Rather, various modifications may be made in the details within the scope and range of equivalents of the claims and without departing from the invention.

Problems can occur in authentication of devices using conventional certificates, for example, when a user changes devices (e.g., from a laptop computer to a cellular telephone) and the login server is unavailable for authentication. That is, in a conventional authentication system, the user cannot change devices to a new device without the issuance by the login sever of a new certificate to the new device. If the login server is unavailable for authentication of the user on the new device, a certificate will not be issued and the user/new device will not be authenticated to any device on the conventional network.

The terms "verifying device" and "confirming device" generally refer to two devices communicating to authenticate: (1) one device to the other device (e.g., a one-way authentication; or (2) mutual authentication of each device to the other device (e.g., a two-way authentication). Moreover, the terms "device" and "peer" may be used interchangeably in this application.

It is contemplated that certain exemplary embodiments of the present invention may include a method of one-way authentication, while other exemplary embodiments of the present invention may include a method of two-way authentication.

It is understood by one of skill in the art, that any two-way authentication may be implemented as 2 independent one-way authentications using a shared secret and any two-way authentication may be partially implemented as a one-way authentication. That is, a partial implementation of a two-way authentication may include, for example, a challenge, a response to the challenge based on the shared secret and a determination whether to authenticate a device/user based on the response to the challenge.

Although certain exemplary embodiments are described as using a public key, private key encryption method, it is contemplated that, alternatively, shared secret key (e.g., a symmetric key) may be used.

Although certain exemplary embodiments are described in terms of a peer-to-peer network, they may be applied to discrete devices or other types of networks, such as centralized server networks, and hybrid networks (for example peer-to peer networks with certain central server functionality), as long as devices use authentication.

Although certain exemplary embodiments are described in terms of a challenge and responses using a random or quasi-random bit string, it is contemplated other authentication schemes are possible, for example challenges and responses based on: (1) Password Authentication Protocol (PAP); (2) Challenge Handshake Authentication Protocol (CHAP); (3) Microsoft CHAP version 1; or (4) Microsoft CHAP version 2.

It should be understood that the methods illustrated may be implemented in hardware, software, or a combination thereof. In such embodiments, the various components and steps described below may be implemented in hardware and/or software.

In a conventional network, if a login server is unavailable, a user (for example User A) may authenticate to a P2P network using a digital certificate previously stored in a device (for example device A1) used in a previous authentication of the user/peer to the P2P network. Since, for example, A1 previously logged into the P2P network and the password of User A had been authenticated by the login server, the login server may have provided device A1 with a digital certificate authenticating User A via device A1 to the P2P network. The digital certificate stored on device A1 in the conventional network is derived from a device identifier of device A1. In the conventional network, when User A logs into P2P network via device A1 using the proper password, authentication of device A1 may occur even if the login server is off-line. The availability of the login server, however, is critical in such a conventional network when User A is first authenticated (prior to the issuance of any digital certificate) or when User A attempts to authenticate using a device different from device A1. That is, the first authentication of any user via any new device to the conventional network is problematic when the login server is unavailable.

FIG. 1 is a schematic diagram of a network to illustrate a method of authentication of a verifying device according to certain exemplary embodiments of the present invention.

Now referring to FIG. 1, a peer to peer (P2P) network 100 includes a gateway device 110, a login server 120, a physical network 130, a plurality of attached devices 140, 150, 160, 170, 180 connected to the physical network 130 via a wide area network, intranet or internet 190. Gateway device 110 may establish a gateway (connection) between any number of network devices A1, B1 and/or C1 and physical network 130. The connection between gateway device 110 and network devices A1, B1 and C1 may be a physical connection (not shown) or, otherwise, may be a wireless connection (as shown by the arrows in FIG. 1). User A may log into physical network 130 and participate in P2P network 100 via device A1 using gateway device 110. User B may log into physical network 130 and participate in P2P network 100 via device B1 using gateway device 110. User C may log into physical network 130 and participate in P2P network 100 via device C1 using gateway device 110.

In certain exemplary embodiments, login server 120 may be unavailable or off-line as denoted by the X shown over login server 120.

Figure 2:
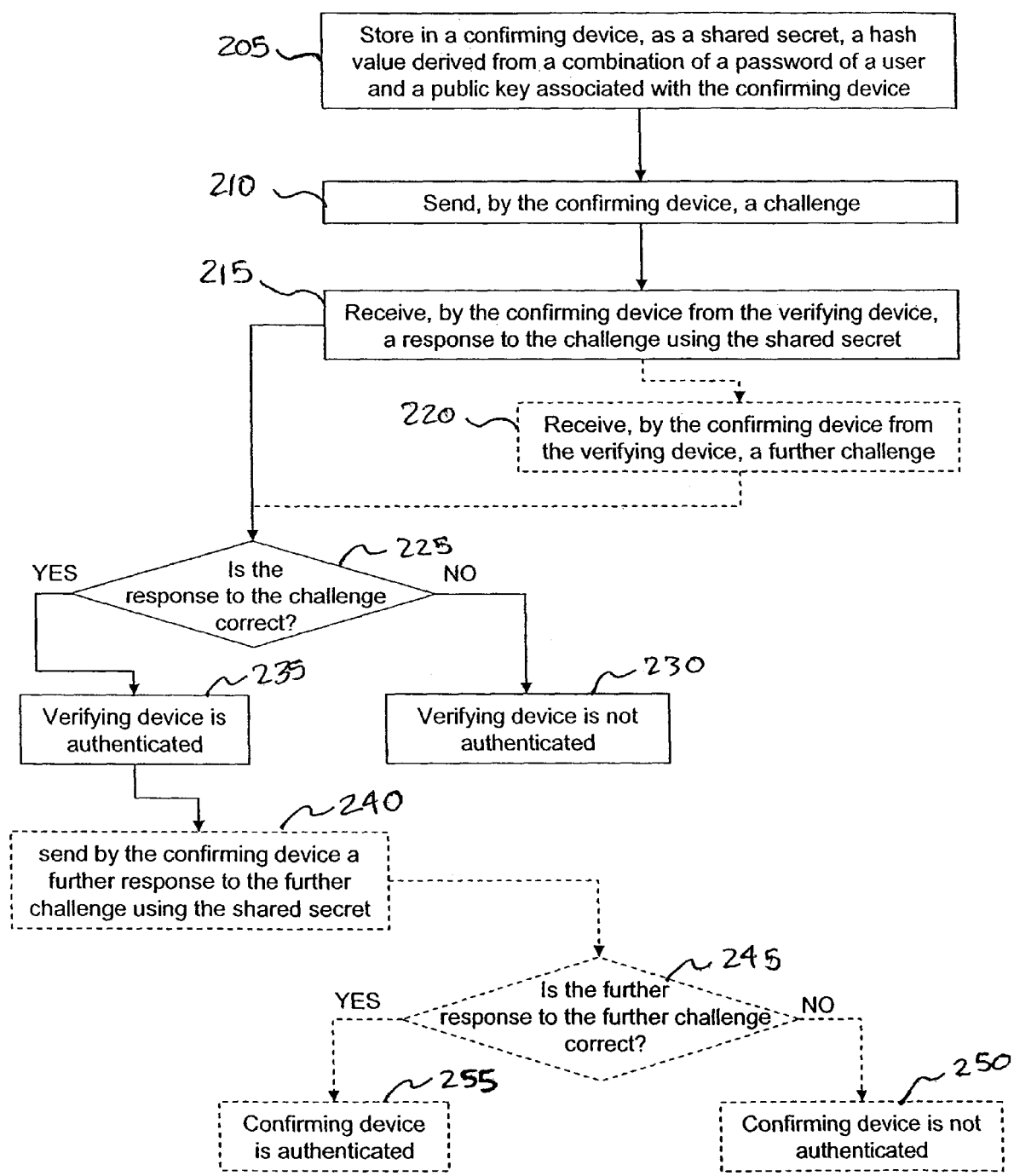
FIG. 2 is a flow chart illustrating a method of authentication of a verifying device according to certain exemplary embodiments of the present invention.

FIG. 2 is a flow chart illustrating a method of authentication of a verifying device according to certain exemplary embodiments of the present invention.

Now referring to FIG. 2, at block 205, a shared secret value (e.g., a hash value derived from a combination of a password of a user (for example, User A shown in FIG. 1)) and a public key associated with a confirming device (for example device B1 shown in FIG. 1) is stored in confirming device B1. The hash value may be derived using any number of known hash functions, for example cryptographic hash functions such as: (1) Secure Hash Algorithm-1 (SHA-1); (2) Data Encryption Standard (DES); (3) Message-Digest Algorithm 5 (MD5); or (4) Triple (DES), among many others. The hash function may be a one-way hash function and may provide a cryptographic value.

The combination of the password of the user (e.g., User A) and the public key associated with confirming device (e.g., B1) may be a concatenation or some other mathematical function of the password of User A with the public key associated with confirming device B1. The hash value stored in confirming device B1 may be a shared secret between confirming device B1 and a verifying device (for example, A1). By storing the shared secret in the confirming device B1 and enabling generation of the shared secret in verifying device A1 based on the user providing (e.g., entering) the password, challenges and responses based on the shared secret may be used to authenticate verifying device A1 and/or confirming device B1 to each other. That is, for example, a new device may be authenticated to confirming device B1 based on the user entering his or her password to the new device and using the password to generate the shared secret used to respond to challenges.

At block 210, a challenge may be sent by confirming device B1 to verifying device A1. This challenge may be any bit string and, desirably may be either randomly generated or quasi-randomly generated. At block 215, verifying device A1 may send a response to the challenge to confirming device B1. The response to the challenge may use or may be based on the shared secret. The response to the challenge also may be generated from verifying device A1 and received by confirming device B1. That is, verifying device A1 may respond to the challenge by sending a response which is derived from a combination of the bit string from the challenge sent by confirming device B1 with the shared secret. For example, the response to the challenge may be a hash value of the shared secret with the challenge bit string.

At optional block 220, confirming device B1 may receive a further challenge from verifying device A1. This optional step at block 220 may be a separate step from the step at block 215 or, otherwise, may be combined with step at block 215. The further challenge, similar to that of the challenge in block 210, may be a random or quasi-random bit string and may be provided to authenticate confirming device B1 to verifying device A1, as a second one-way authentication (e.g., the first one-way authentication being the authentication of verifying device A1 to confirming device B1).

At block 225, confirming device B1 may determine whether the response to the challenge sent by the verifying device is correct. The determination of whether the response to the challenge is correct may include confirming device B1 comparing the hash value received from verifying device A1. The received hash value may be derived from a combination of the challenge with the shared secret and may be compared to a generated hash value. The generated hash value may be generated by confirming device B1 using a hash function common to both the confirming and verifying devices B1 and A1. The generated hash value may be generated using the common hash function with the combination of the previously stored shared secret and challenge.

At block 230, if the response to the challenge is not correct, the verifying device A1 is not authenticated. Further, a message may be sent to verifying device A1 notifying it that it has not been authenticated.

At block 235, if the response to the challenge is correct, the verifying device is authenticated. Further, a message may be sent to verifying device A1 notifying it that it has been authenticated.

In certain embodiments, a second one-way authentication may occur. That is, if the further challenge had been received at optional block 220 by confirming device B1, optional blocks 240, 245, 250, and 255 may be implemented, and authentication of confirming device B1 may occur in the steps associated with blocks 240, 245, 250 and 255.

At optional block 240, a further response to the further challenge received by confirming device B1 at block 220 may be sent to verifying device A1 using the shared secret. That is, the response to the further challenge may be in the same form as the challenge at block 210 or, otherwise, may be in a different form know in the art.

At optional block 245, verifying device A1 may determine whether the further response to the further challenge is correct. The determination may include a comparison of a hash value derived from the response to the challenge received from confirming device B1 to the hash value derived from a combination of the password (that is either stored in the verifying device or, otherwise, provided by the user) with the further challenge.

At optional block 250, if the further response to the further challenge is not correct, confirming device B1 is not authenticated. At optional block 255, if the further response to the further challenge is correct, confirming device B1 is authenticated. That is, at optional block 255, both the verifying and confirming devices A1 and B1 and their respective public keys may be authenticated.

Although authentication is described as being to a particular device, it is contemplated that the authentication may be to a portion or the entire P2P network 100. That is, the device providing the authentication (i.e., the authenticating device) may publish authentication information for other devices on P2P network 100, or, otherwise, provide a digital certificate to the device being authenticated (i.e., the authenticated device) allowing authentication of the authenticated device to other devices on the P2P network 100 based on (1) the publication by a trusted device (i.e., the authenticating device); and/or (2) an issued digital certificate from the trusted device.

In various exemplary embodiments, the shared secret is described as a hash value. It is contemplated that other mathematical algorithms may be used under the condition that they sufficiently obfuscate the password in the resulting shared secret.

In various exemplary embodiments, the shared secret is described as derived from a combination of a password of a user and a public key associated with a confirming device. It is contemplated, that the shared secret may be derived by an operation on at least the password of the user. For example, the shared secret may be derived by: (1) scrambling the password of the user; (2) encrypting the password; (3) hashing the password; and/or (4) some other mathematical function to obfuscate the password in the resulting shared secret.

In various exemplary embodiments, the shared secret is described as derived from a combination of a password of a user and a public key associated with a confirming device. It is contemplated, that the shared secret may be derived from a combination of the password and any other published (known) information. This combination may be scrambled, encrypted, hashed and/or obfuscated.

One skilled in the art will recognize that any device (e.g., a first device) which has access to a password (e.g., of User A) may authenticate itself to any other device (e.g., a second device) which has a shared secret (derived from the password of User A) without communicating the password of User A.

Figure 3:
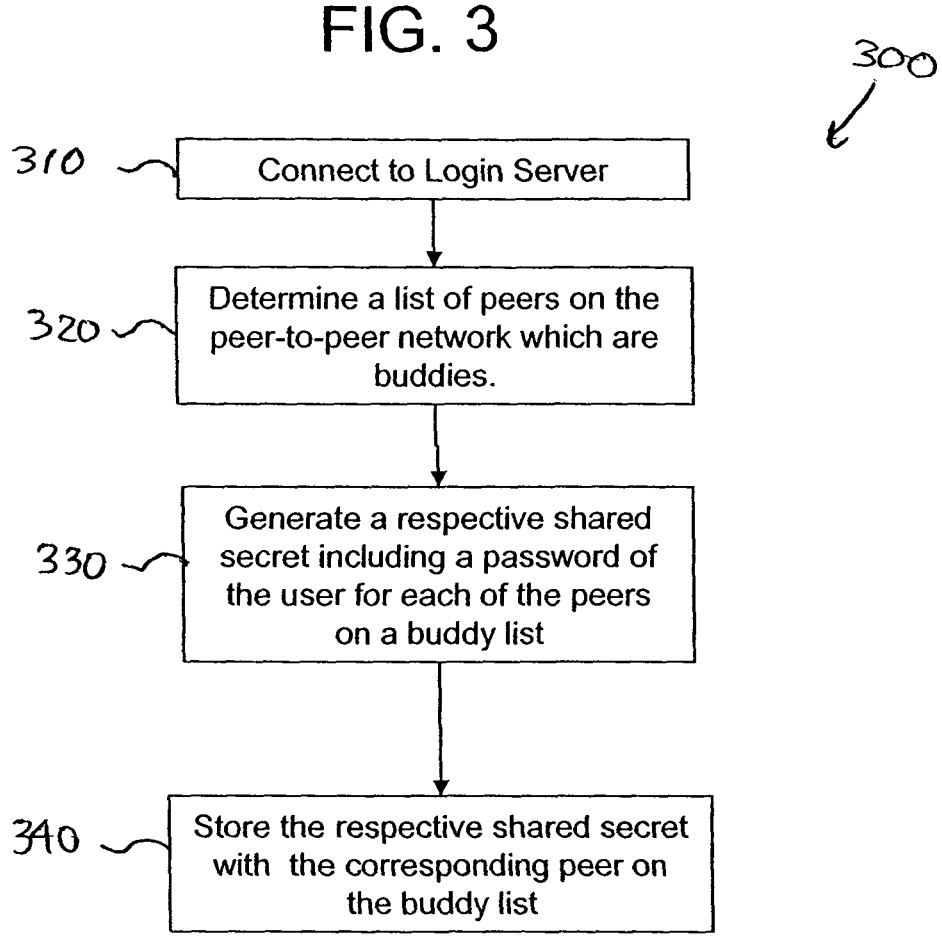
FIG. 3 is a flow chart illustrating a method of storing a shared secret between or among peers in accordance with various exemplary embodiments of the present invention.

FIG. 3 is a flow chart illustrating a method 300 of storing a shared secret in respective peers in accordance with various exemplary embodiments of the present invention.

Now referring to FIG. 3, at block 310, a peer, a device or a node may communicate with a login server. That is, for example, User A may connect to P2P network 100 via device A1 and may communicate with login server 120 to authenticate device A1 to P2P network 100. At block 320, a list of users and or/peers on P2P network 100 which are cooperative may be determined. It may be desirable for login server 120 to maintain and/or to determine a cooperation list for each device A1, B1, C1, 140, 150, 160, 170 or 180. Login server 120 may maintain the cooperation list of cooperative users and/or cooperative devices which may want to communicate together when the users/devices are, for example, isolated from either P2P network 100 and/or login server 120. Alternatively, each user, User A, User B or User C, for example, may generate a cooperation list at corresponding device A1, B1 or C1 and may maintain these cooperation lists separately and/or collectively: (1) in one or more peers A1, B1, C1, 140, 150, 160, 170 or 180 or assign the task of maintaining and distributing these lists to the appropriate peers in the respective cooperation lists or (2) in login server 120.

In various exemplary embodiments, a cooperation list is described with reference to FIGS. 3, 4, 5, 6 and 7. In this cooperation list, peers/devices A1, B1 and C1 are initially listed and may be updated according to method 300.

At block 330, a shared secret derived from or including a password of a user (for example, user A) for each of the peers on the cooperation list may be generated. For example, if A1, B1 and C1 are cooperative devices listed in the cooperation list, device A1 may generate a first shared secret for device B1 and a second shared secret for device C1. Device B1 may generate a third shared secret for device A1 and a fourth shared secret for device C1. Device C1 may generate a fifth shared secret for device A1 and a sixth shared secret for device B1. The first and second shared secrets may include or may be derived from the password of User A. The third and fourth shared secrets may include or may be derived from the password of User B and the fifth and sixth shared secrets may include or may be derived from the password of User C.

Although different shared secrets are illustrated for different devices (i.e., the first and second shared secrets are illustrated for device A1 with respect to devices B1 and C1), it is contemplated that a common shared secret may be generated, for example, with respect to device A1 for any peer on its cooperation list. In this instance, the shared secret may be derived from a hash of the user's password with a combination of each respective public key of the devices listed in the cooperation list (e.g., device B1 and C1, for example). In this case, the public keys may be published and available to peer A1, B1, C1, 140, 150, 160, 170 or 180 on or joining P2P network 100 so that their public keys are available for regeneration of the shared secret.

At block 340, the respective shared secrets are stored with the corresponding peer listed in the cooperation list. That is, the first shared secret may be stored with device B1, the second shared secret may be stored with device C1, the third shared secret may be stored with device A1 and so on. By storing the respective shared secret in the corresponding peer that is listed in the cooperation list, when login server 120 is not available or is off-line, the corresponding peer may authenticate a user and device based on the corresponding stored shared secret without communicating the password of the user to any other peer in P2P network 100.

Figure 4:
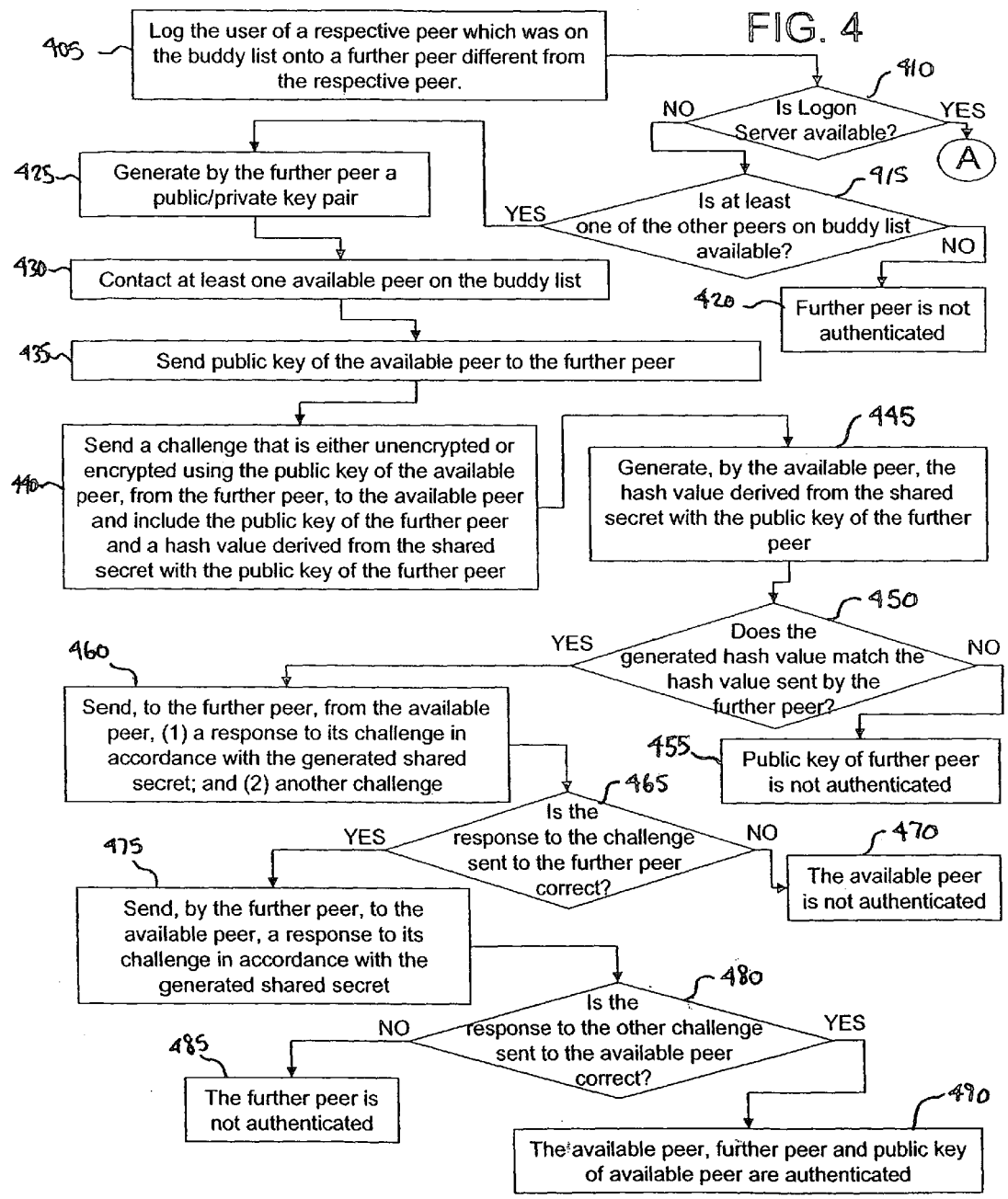
FIG. 4 is a flow chart illustrating a method of authentication of a verifying device in accordance with an exemplary embodiment of the present invention.
Figure 5:
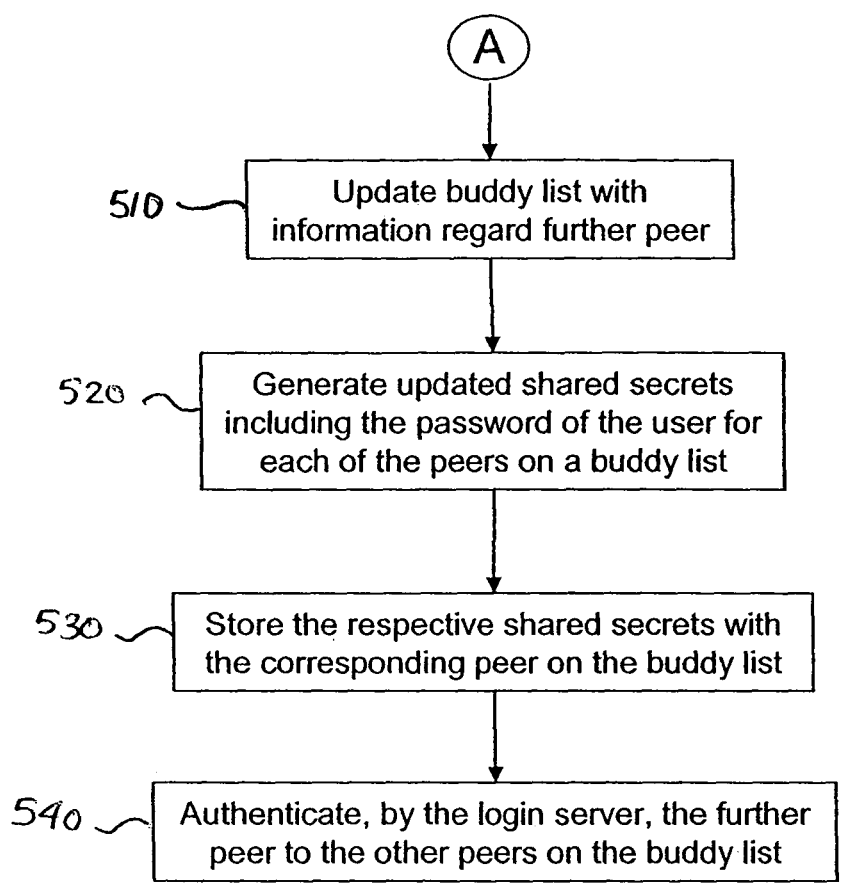
FIG. 5 is a flow chart illustrating a method of updating a cooperation list (or cooperative device list) and shared secret in accordance with various exemplary embodiments of the present invention.

FIG. 4 is a flow chart illustrating a method 400 of authentication of a verifying device in accordance with an exemplary embodiment of the present invention. FIG. 5 is a flow chart illustrating a method of updating a cooperation list and shared secret in accordance with various exemplary embodiments of the present invention.

In certain exemplary embodiments, steps 405, 410, 510, 520, 530 (shown in FIG. 4) and 540 (shown in FIG. 5) may be provided, for use with login server 120. It is contemplated, however, that login server 120 may not be necessary, as long as the cooperation list is generated/maintained using any one or more of the peers on P2P network 100 or any other dedicated network resource available to the peers listed in the cooperation lists.

It is further contemplated that in certain exemplary embodiments that a user may login to P2P network 100 via a different peer, which is not listed in the cooperation list, using a user's password. That is, for example, User A may log into/authenticate with P2P network 100 via device A2 (not shown) using a derived shared secret (derived from the password of User A) which correspond to the shared secret stored in either device B1 or device C1.

In certain exemplary embodiments, a login server 120 if available may be used to authenticate a new peer on a peer-to-peer network 100. Further, the login server 120 may maintain a list of user or peers on P2P network 100 that are cooperative (e.g., users or devices which work together, cooperatively or in tandem, e.g., on a personal area network, on a local area network, or through wireless connections, among many others).

Now referring to FIG. 4, a user (for example, User A) of a respective peer (for example, device A1) which is listed in the cooperation list (for example, devices A1, B1 and C1 may be listed on a respective cooperation list) may log onto a further peer (for example, A2 which is not shown) different from the respective peer A1.

At block 410, further peer A2 may determine whether login server 120 is available (accessible and on-line). If login server 120 is available, the process proceeds to the block marked A which is shown in FIG. 5 and which will be described below.

At block 415, if login sever 120 is unavailable (e.g., off-line or inaccessible), further peer A2 may determine whether at least one of the other peers listed in the cooperation list of User A is available by performing a search for at least one other peer and requesting authentication of User A in the search request. At block 420, if none of the these other peers that are listed in the cooperation list is available, further peer A2 requesting authentication may not be authenticated to P2P network 100 or any of the other peers that are listed in the cooperation list.

At block 425, if at least one of the other peers listed in the cooperation list is available, further peer A2 may generate a public/private key pair. At block 430, further peer A2 may contact the available peer which is listed in the cooperation list, for example, device B1. At block 435, available peer B1 may send its public key to further peer A2.

Although in various exemplary embodiments a public/private key pair is used for encryption, it is contemplated that a symmetric key (i.e., a private, secret key, alternatively, may be used.

At block 440, a challenge that is either unencrypted or encrypted using the public key of available peer B1 may be sent from further peer A2 to available peer B1. This challenge may include the public key of further peer A2 and a hash value derived from the shared secret with the public key of further peer A2. Alternatively, the challenge may include only the hash value derived from the shared secret with the public key of A2. In such circumstances, the public key of A2 may be published or, otherwise, available to B1.

Although the hash value included in the challenge is described to be derived from the public key of available peer B1 and the shared secret, it is contemplated that other information may be included with the public key and shared secret. For example, unique identifiers of further peer A2 and/or available peer B1, among others.

In certain embodiments, the hash value may be derived from the public keys of more than one peer with the shared secret to provide a common hash value for multiple peers on the cooperation list. In this case, the public keys may be published or, otherwise, may be made available to all of the peers associated with a corresponding cooperation list. One of skill in the art will recognize that authentication may occur using a hash value of a shared secret with a plurality of public key in a similar manner as a shared secret with a single public key.

At block 445, available peer B1 may generate a hash value derived from the shared secret stored at block 340 (see FIG. 3) with the public key of further peer A2 provided either in the challenge, through a publication of the public key or, otherwise made available to available peer B1.

At block 450, available peer B1 may determine whether the generated hash value derived from the stored shared secret and public key of further peer A2 matches the hash value in the challenge sent by further peer A2 at block 440. At block 455, if the generated hash value and hash value sent by further peer A2 do not match, the public key of further peer A2 is not authenticated. That is, the process ends because further peer A2 does not have the proper public key.

At block 460, if the generated hash value and the hash value sent by further peer A2 match, the public key of further peer A2 is authenticated. Moreover, available peer B1 may send further peer A2: (1) a response to its challenge in accordance with the generated shared secret; and (2) another challenge. This challenge may be a random bit string or a quasi-random bit string. In this instance, the response to this challenge may be: (1) a hash value derived from the challenge bit string and the shared secret; or (2) a function applied to the challenge bit string and the shared secret.

It is contemplated that any other challenge response known to those skill in the art may be used.

At block 465, further peer A2 may determine whether the response to the challenge is correct, that is, whether the response to the challenge sent to further peer A2 matches, for example, to a hash value generated by a combination of the shared secret with the challenge (e.g., the challenge bit string).

At block 470, if the response to the challenge is not correct, available peer B1 is not authenticated. At block 475, if, however, the response to the challenge sent to further peer A2 is correct, further peer A2 may send to available peer B1 a response to its challenge in accordance with the generated shared secret. That is, available peer B1, at block 460, sends another challenge (a second challenge) and if the response to the first challenge sent with that second challenge is correct then further peer A2 may respond to the second challenge. The second challenge may be similar in form to the first challenge sent at block 440 or it may be different. That is, the second challenge may also be a challenge bit string or may take the form of a different type of challenge.

Although a challenge (e.g., a bit string) and a response to this type of challenge is shown, it is contemplated that in certain exemplary embodiments of the invention, a peer may provide, for example, a bit string and a hash value derived from the bit string with the shared secret, in a single message to an authenticating device. In such case, a one-way authentication may occur based on the single message to the authenticating device.

At block 480, available peer B1 may determine whether the response to the second challenge is correct. That is, available peer B1 may determine whether the response to the second challenge matches a derived second response to the second challenge based on published information or information stored in available peer B1. At block 485, if the response to the second challenge is not correct, further peer A2 is not authenticated. At block 490, if, however, the response to the second challenge is correct then available peer B1, further peer A2 and the public key of available peer B1 are all authenticated.

It is contemplated that authentication with available peer B1 may allow authentication with: (1) only available peer B1; (2) all available peers listed in the cooperation list; or with (3) P2P network 100. That is, authentication by available peer B1 may provide for authentication with some or all of the peers on P2P network 100.

It is also contemplated that in certain exemplary embodiments, authentication may occur with each available peer listed in the cooperation list. That is, this method may be repeated with a second peer or any further set of available peers that are listed in the cooperation list.

FIG. 5 is a flow chart illustrating a method of updating a cooperation list and shared secret in accordance with various exemplary embodiments of the present invention.

Now referring to FIG. 5, at block 510, a cooperation list may be updated with information regarding further peer A2. That is, since login server 120 is available at block 410 (as shown in FIG. 4), login server 120 may update each, respective cooperation list. For example, the cooperation list which includes peers A1, B1, and C1, may be updated to reflect further peer A2 being associated with User A and authenticated to login server 120.

In certain exemplary embodiments, each shared secret may include a peer/device identification (e.g., a unique ID) for the peer/device being authenticated (for example, device A1), the password of the user, another peer/device identification (e.g., another unique ID) of the peer/device for which the shared secret is to be stored (for example device B1) and its public key. The shared secret maybe a hash of these values so that the user's password is not shared.

In such a case, when the user log's onto a different device (e.g., device A2) than that which is listed in the cooperation list and stored in login server 120, the shared secret may be updated by generating a new shared secret derived from, for example, the device identification of the different device (e.g., device A2) which is being authenticated through P2P network 100.

Although it is shown in this exemplary embodiment that a device ID may be included in the shared secret, it is contemplated that such a device ID may be omitted. In such a case, generation of an updated shared secret may not be necessary, since the shared secret corresponds to the user's password and the public key of the correspondent. Thus, block 520 may be optional according to the information components in the shared secret. If, however, the device ID of the device being authenticated is used to derive the shared secret, then each shared secret generated at block 330 may updated in accordance with the device ID of further peer A2.

At block 530, the respective shared secrets are stored with the corresponding peers listed in the cooperation list. The storing of the respective shared secrets is similar to that described in block 340. At block 540, login server 120 may authenticate further peer A2 to the other peers B1 and C1 listed in the cooperation list. That is, since the login server 120 is available, authentication via login server 120 may be provided to further peer or, otherwise, may be provided by any peer (e.g., peer B1 or peer C1) listed in the cooperation list. Authentication by the log in server 120 of the further peer A2 to some or all peers of P2P network 100 may be based on a respective shared secret derived from the password of User A or from the password of User A itself.

FIG. 6 is a flow chart illustrating a method 600 of authentication in accordance with another exemplary embodiment of the present invention.

FIG. 6 includes blocks 405, 410, 415, 420 and 425 which have been previously described with respect to FIG. 4, accordingly, a detailed description of these blocks has been omitted for brevity.

Now referring to FIG. 6, after block 425, the search for peers listed in the cooperation list is completed at block 630. The search for peers listed in the cooperation list may include User A requesting peer A2 to look for User B and/or User C on P2P network 100. That is, a user requesting authentication may generate a request of P2P network 100 and/or of a peer on P2P network 100 to find one or more particular users that are listed in the cooperation list.

At block 635, further peer A2 or another peer 140, 150, 160, 170 or 180 on P2P network 100 may request communication of an available peer (e.g., B1 or C1) of the particular user that is listed in the cooperation list. In the message to available peer B1 or C1, further peer A2 may include a first challenge string/function. The first challenge string/function may be one of: (1) a text string; (2) a bit string; or (3) may be a mathematical function. At block 640, available peer (e.g., B1) that is listed in the cooperation list may send to further peer A2: (1) its public key; (2) a second challenge string/function; and (3) a hash value derived from the shared secret the first challenge string/function and the second challenge string/function. The second challenge string/function may be formed in the same manner as the first challenge string/function. That is, the second challenge string/function may include challenge text, a bit string, or a mathematical function. In this way, if the first challenge sting/function is a text string or bit string, the hash value may be derived from the shared secret, the first challenge string (text or bit string) and the second challenge string (text or bit string). The first challenge string and the second challenge string may be concatenated with the shared secret and the combination of the concatenated shared secret, the first challenge string and the second challenge string may be hashed to provide a hash value. Alternatively, the shared secret may be operated on by the first challenge function which may be a mathematical function and the output of that function may be operated on by the second challenge function which may or may not be then be hashed to produce a hash value.

It is understood by one skilled in the art that the hash value derived from the shared secret first challenge string/function and second challenge string/function may be any combination of the shared secret with another string of information and/or any challenge function (e.g., mathematical manipulation of the shared secret using any variety of different functions). That is, the hash value may be derived so long as the shared secret, the first challenge string/function and second challenge string/function are known to a peer or user authenticating the hash value.

At block 645, further peer A2 may determine whether the hash value sent by available peer B1 is correct, that is, whether the hash value derived from the shared secret, the first challenge string and the second challenge string matches a hash value generated from the shared secret derived in further peer A2, the first challenge string/function sent by further peer A2 and the second challenge string/function received from available peer B1.

At block 650, if the hash value sent to further peer A2 is not correct, available peer B1 is not authenticated. At block 655, however, if the hash value sent to further peer A2 is correct, further peer A2 may send to available peer B1: (1) a response to the second challenge string/function; (2) its public key; and (3) a hash value derived from the shared secret first challenge string/function and its public key. The hash value may further be derived from peer identifications of further peer A2 and available peer B1.

At block 660, available peer B1 may determine whether the response to the second challenge string/function sent from further peer A2 is correct. At block 665, if the response sent from further peer A2 is not correct, further peer A2 is not authenticated. At block 670, however, if the response from further peer A2 is correct, available peer B1, further peer A2 and the public keys of available peer B1 and further peer A2 are all authenticated.

FIG. 7 is a flow chart illustrating a method 700 of authentication in accordance with yet another exemplary embodiment of the present invention.

FIG. 7 includes blocks 405, 410, 415, 420 and 425 which have been previously described with respect to FIG. 4. Accordingly, a detailed description has been omitted for brevity.

Now referring to FIG. 7, after block 425, the search for at least one peer listed in the cooperation list is completed at block 730. The search for the at least one peer listed in the cooperation list may include User A requesting peer A2 to look for User B on P2P network 100. That is, a user requesting authentication may generate a request of P2P network 100 and/or of a peer on P2P network 100 to find one or more particular users that are listed in the cooperation list.

At 735, further peer A2 may provide its generated public key to the at least one available peer (e.g. peer B1). At block 740, available peer B1 may send a challenge which is either unencrypted or encrypted using the public key of further peer A2 to the further peer A2.

At block 745, peer A2 may generate the shared secret key and a response to the challenge sent by peer B1 based on the generated secret key. That is, because further peer A2 is not listed in the cooperation list, it does not know the shared secret. However, since further peer A2 knows (1) the password of User A (e.g., User A is authenticating via further peer A2) and (2) the public key of available peer B1 that is listed in the cooperation list, it may generate the shared secret.

At block 750, further peer A2 may send to available peer B1: (1) the generated response to the challenge; and (2) another challenge (a second challenge) which is either encrypted or unencrypted using the public key of available peer B1. At block 755, available peer B1 may determine whether the response from further peer A2 is correct. At block 760, if the response from further peer A2 is not correct, further peer A2 is not authenticated. At block 765, if, however, the response from further peer A2 is correct, available peer B1 may send to further peer A2 a response to the second challenge based on the generated shared secret.

At block 770, further peer A2 may determine whether the response to the second challenge sent to it is correct. At block 775, if the response to the second challenge sent to further peer A2 is not correct, available peer B1 is not authenticated. At block 780, however, if the response to the second challenge sent to further peer A2 is correct, available peer B1, further peer A2 and the public keys of the available peer B1 and further peer A2 are authenticated.

Method 700 provides an advantage in that the number of communications (messages) exchanged between two peers mutually authenticating each other is reduced compared to other exemplary methods of authentication.

According to certain exemplary embodiments, methods of authentication are provided which eliminate the sharing of user passwords in the authentication process, thereby improving security.

Although the invention has been described in terms of an authentication method, it is contemplated that it may be implemented in software on microprocessors/general purpose computers. In various embodiments, one or more of the functions of the various components may be implemented in software that controls a general purpose computer. This software may be embodied in a computer readable carrier, for example, a computer readable storage medium (i.e., a magnetic or optical disk, or a memory-card) or an audio frequency, radio-frequency, or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of authentication of a verifying device by a confirming device using a peer list, the method comprising the steps of:
 a) receiving and storing in the confirming device: (1) the peer list of trusted peers; and (2) a shared secret derived from at least a password of a user;
 b) receiving and storing in the verifying device the peer list of trusted peers, where the confirming device is new to the verifying device;
 c) sending, by the confirming device, a challenge responsive to the verifying device being listed in the peer list received by the confirming device;
 d) sending, by the verifying device, a response to the challenge using the shared secret;
 e) determining if the response to the challenge is correct; and
 f) if the response to the challenge is correct, authenticating the verifying device.

2. The method of claim 1, wherein the shared secret is a hash value derived from the password of the user.

3. The method of claim 1, wherein the shared secret is a hash value derived from a combination of the password of the user and a public key associated with the confirming device.

4. The method of claim 1, further comprising authenticating the confirming device by the verifying device, the method further comprising the steps of:
 g) receiving, by the confirming device, a further challenge;
 h) sending, by the confirming device, a further response to the further challenge using the shared secret;
 i) determining if the response to the further challenge is correct; and j) if the response to the further challenge is correct, authenticating the confirming device.

5. The method of claim 4, further comprising the steps of:
generating the further challenge as a random or quasi-random bit string; and
generating the further response to the further challenge based on a combination of the random or quasi-random bit string with the shared secret.

6. The method of claim 5, wherein generating the further response to the further challenge includes generating the further response to the further challenge as a hash value derived from a combination of the random or quasi-random bit string with the shared secret.

7. The method of claim 4, wherein step (g) of receiving, by the confirming device, the further challenge, occurs prior to step (a) and includes the step of receiving a message that includes: (1) the further challenge, (2) a public key associated with the verifying device and (3) a hash value based on a combination of the shared secret with the public key associated with the verifying device; the method including the steps of:
validating, by the confirming device, the public key of the verifying device by:
generating a hash value using the public key associated with the verifying device sent in the message and the shared secret,
comparing the generated hash value to the hash value sent in the message, and
if the generated hash value matches the hash value sent in the message match, authenticating the public key of the verifying device.

8. The method of claim 1, wherein step (a) of storing in the confirming device the shared secret includes the step of establishing the shared secret in the confirming device using another device.

9. The method of claim 1, further comprising, prior to step (d), the step of establishing, by the verifying device, the response to the challenge by:
obtaining the password of the user;
generating the shared secret from the password; and
determining the response to the challenge based on the generated shared secret and the public key associated with the confirming device.

10. The method of claim 1, further comprising the steps of:
generating the challenge as a random or quasi-random bit string; and
generating the response to the challenge based on a combination of the random or quasi-random bit string with the shared secret.

11. The method of claim 10, wherein the step of generating the response to the challenge includes generating the response to the challenge as a hash value derived from a combination of the random or quasi-random bit string with the shared secret.

12. The method of claim 1, further comprising, prior to step (a), the step of:
determining the shared secret by hashing the password of the user with a public key associated with the confirming device.

13. The method of claim 1, further comprising the steps of:
providing a public key associated with the verifying device to the confirming device; and
encrypting the challenge using the public key of the verifying device.

14. The method of claim 1, further comprising the steps of:
providing a public key associated with the confirming device to the verifying device; and
encrypting the response using the public key of the confirming device.

15. The method of claim 1, further comprising the steps of:
providing a public key associated with the confirming device to the verifying device; and
encrypting the shared secret using the public key of the confirming device.

16. The method of claim 1, further comprising the step of:
generating the password using one or more of: (1) text; (2) a binary string; (3) an identification associated with the user; and (4) biometric information obtained from the user.

17. The method of claim 1, wherein the challenge and response are communicated without any encryption thereof.

18. The method of claim 1, further comprising the step of:
generating session keys for communication by the verifying and confirming devices using the shared secret.

19. The method of claim 1, wherein step (f) of authenticating the verifying device includes authenticating the verifying device to one or both of the confirming device and/or the network.

20. A method of authentication of a verifying device by a confirming device using a peer list, the method comprising the steps of:
a) receiving and storing in the confirming device: (1) the peer list of trusted peers; and (2) a shared secret derived from at least a password of a user;
b) receiving and storing in the verifying device the peer list of trusted peers, where the confirming device is new to the verifying device;
c) sending, by the verifying device, a challenge including a first challenge bit string;
d) sending, by the confirming device, responsive to the verifying device being listed in the peer list received by the confirming device a response to the challenge including (1) a second challenge bit string and (2) a value derived from a combination of the shared secret, the first challenge bit string and the second challenge bit string; and
e) determining if the response to the challenge is correct; and
f) if the response to the challenge is correct, authenticating the confirming device.

21. The method of claim 20, wherein:
the shared secret is a hash value including a combination of the password of the user and a public key associated with the confirming device;
the response to the challenge includes a public key associated with the confirming device; and
the value derived from the combination of the shared secret, the first challenge bit string and the second challenge bit string is a hash value of the combination of the shared secret, the first challenge bit string and the second challenge bit string.

22. The method of claim 21, wherein step (e) of determining if the response to the challenge is correct includes the steps of:
generating a hash value using the shared secret, the first challenge bit string sent by the verifying device, and the second challenge bit string in the response to the challenge; and
comparing the generated hash value to the hash value sent in the response to the challenge.

23. The method of claim 22, further comprising the steps of:
if the response to the challenge is correct, receiving by the confirming device a third message including (1) a public key of the verifying device and (2) a further hash value derived from a combination of the shared secret, the second challenge bit string and the public key of the verifying device;

determining if the further hash value is correct; and if the response to the challenge is correct, authenticating the verifying device.

24. The method of claim 21, wherein step (a) of storing the shared secret in the confirming device includes the step of establishing the shared secret in the confirming device using another device.

25. A method of authentication of a verifying device by a confirming device using a secret, the method comprising the steps of:

a) receiving and storing in the confirming device: (1) a peer list of trusted peers on a network; and (2) the secret derived from at least a password of a user;

b) receiving and storing in the verifying device the peer list of trusted peers, where the confirming device is new to the verifying device;

c) sending, by the confirming device to the verifying device, a challenge responsive to the verifying device being listed in the peer list received by the confirming device;

d) generating in the verifying device the secret using the password provided by the user;

e) sending, by the verifying device, a response to the challenge using the generated secret;

f) determining, by the confirming device, if the response to the challenge is correct; and g) if the response to the challenge is correct, authenticating the verifying device.

26. The method according to claim 25, further comprising, prior to step (a), the steps of:

generating by an other device the secret; and sending to the confirming device the generated secret for storage.

27. The method according to claim 26, further comprising the step of:

eliminating, from the verifying device and the other device, the secret generated therein such that each time a challenge is received from the confirming device the secret is either generated or regenerated.

28. A non-transitory computer readable storage medium for storing program code for execution on a computer to implement a method according to claim 1.

* * * * *